US008724848B1

(12) United States Patent
Heath et al.

(10) Patent No.: US 8,724,848 B1
(45) Date of Patent: May 13, 2014

(54) LOCATING OBJECTS USING INDICIA

(75) Inventors: Taliver Brooks Heath, Mountain View, CA (US); Keir B. Mierle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 334 days.

(21) Appl. No.: 12/944,597

(22) Filed: Nov. 11, 2010

(51) Int. Cl.
*G06K 9/00* (2006.01)
*G01C 21/02* (2006.01)
*G06K 9/46* (2006.01)
*G01S 3/786* (2006.01)
*G06T 7/00* (2006.01)
*G06K 9/32* (2006.01)

(52) U.S. Cl.
CPC ...... *G01C 21/025* (2013.01); *G06K 2009/3225* (2013.01); *G06K 9/4609* (2013.01); *G01S 3/7867* (2013.01); *G06T 7/0042* (2013.01); *G06T 2207/30204* (2013.01); *G06T 2207/30208* (2013.01)
USPC ........... 382/103; 382/201; 382/291; 701/513; 348/169

(58) Field of Classification Search
CPC ................... G06K 9/4609; G06K 2009/3225; G01C 21/025; G01S 3/7867; G06T 7/0042; G06T 2207/30204; G06T 2207/30208
USPC ............ 382/103, 201, 291; 701/513; 348/169
See application file for complete search history.

(56) References Cited

U.S. PATENT DOCUMENTS

| 7,231,063 | B2 * | 6/2007 | Naimark et al. | 382/103 |
| 7,368,745 | B2 * | 5/2008 | Kouris et al. | 250/550 |
| 7,706,917 | B1 | 4/2010 | Chiappetta et al. | |
| 8,472,735 | B2 * | 6/2013 | Lane et al. | 382/235 |
| 8,472,736 | B2 * | 6/2013 | Lane et al. | 382/235 |
| 8,472,737 | B2 * | 6/2013 | Rachlin et al. | 382/235 |
| 2007/0262933 | A1 * | 11/2007 | Streitz | 345/82 |
| 2010/0082193 | A1 | 4/2010 | Chiappetta | |

OTHER PUBLICATIONS http://robotstocknews.blogspot.com/2010/09/irobot-patents-new-roomba-navigation.html, retrieved Oct. 8, 2010, 6 pages.
http://www.engadget.com/2010/09/30/irobot-patents-celestial-navigation-system-for-the-roomba/, retrieved Oct. 8, 2010, 6 pages.
Lang, et al., Blind astrometric calibration of arbitrary astronomical images, Journal reference: Astron J, 139, 1782 (2010); 54 pages.

* cited by examiner

*Primary Examiner* — Jason M Repko
*Assistant Examiner* — Katrina Fujita
(74) *Attorney, Agent, or Firm* — Fish & Richardson P.C.

(57) ABSTRACT

This specification relates to locating objects using indicia. In general, one innovative aspect of the subject matter described in this specification can be embodied in methods that include the actions of obtaining an image captured from a camera in proximity of an object located in an indoor facility, the image being of a portion of a surface of the indoor facility comprising a plurality of visible indicia, the camera having an orientation generally pointed at the surface. A plurality of local indicia are identified within the image. The locations of the local indicia within the image and an index of the visible indicia of the surface are used to determine the location of the object relative to the surface.

23 Claims, 5 Drawing Sheets

LOCATING OBJECTS USING INDICIA

BACKGROUND

People have sought to determine the locations of objects for centuries. Ancient Phoenicians used the stars to roughly determine the locations of their ships, and sextant usage for celestial navigation dates to the mid 1750s.

More recently, global positioning system (GPS) receivers have become popular for locating objects that are outdoors. For example, cars and boats frequently use GPS for navigation. GPS receivers typically cannot be used indoors because they require a clear view of the sky to receive satellite signals.

For locating objects that are indoors, distances can be measured using tape, laser rangefinders, or using acoustic or radar echo-location. Radio frequency identification (RFID) tags can be used to determine how far away an object is, but not its precise location.

SUMMARY

This specification relates to locating objects using indicia.

In general, one innovative aspect of the subject matter described in this specification can be embodied in methods that include the actions of obtaining an image captured from a camera in proximity of an object located in an indoor facility, the image being of a portion of a surface of the indoor facility comprising a plurality of visible indicia, the camera having an orientation generally pointed at the surface; identifying a plurality of local indicia within the image; using the locations of the local indicia within the image and an index of the visible indicia of the surface, determining the location of the object, including: determining a location of the local indicia on the surface using the index; and based on the location of the local indicia on the surface, determining the location of the object. Other embodiments of this aspect include corresponding systems, apparatus, and computer programs, configured to perform the actions of the methods, encoded on computer storage devices.

These and other embodiments can each optionally include one or more of the following features. A visible indicia is a painted shape or an optically projected shape. The visible indicia are distributed on the surface in a random pattern. The object is an equipment rack and the surface is a ceiling of the indoor facility.

Identifying the plurality of local indicia within the image includes detecting and removing features of the surface from the image. The features comprise lines. Identifying the plurality of local indicia within the image includes adjusting the image for variations of the orientation of the camera towards the surface.

The index of the visible indicia includes a plurality of hash codes, each hash code being based on the locations of a group of visible indicia. Determining the location of the object relative to the surface includes determining an object hash code using the locations of one or more local indicia and comparing the object hash code to hash codes in the index. Determining the location of the object further comprises verifying one or more location hypotheses.

The actions further comprise receiving a request for the location of the object. The actions further comprise presenting a graphical display including an indication of the location of the object. The request is received from a user using a mobile device. Presenting a graphical display comprises sending location information to the mobile device.

Particular embodiments of the invention can be implemented to realize one or more of the following advantages. Cameras can be used for precise location of objects relative to a surface. For example, equipment racks in a data center can be outfitted with cameras, and the ceiling of the data center can be covered with randomly spaced paint blots. Then the racks can be found using an index of the locations of the paint blots on the ceiling. This is advantageous in locations, like data centers, where equipment is frequently moving, manual logging is unreliable, and global positioning system (GPS) locating is not available or lacks sufficient precision. This is also advantageous in locations, like data centers, where RFID based location systems have limited accuracy due to electrical noise.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
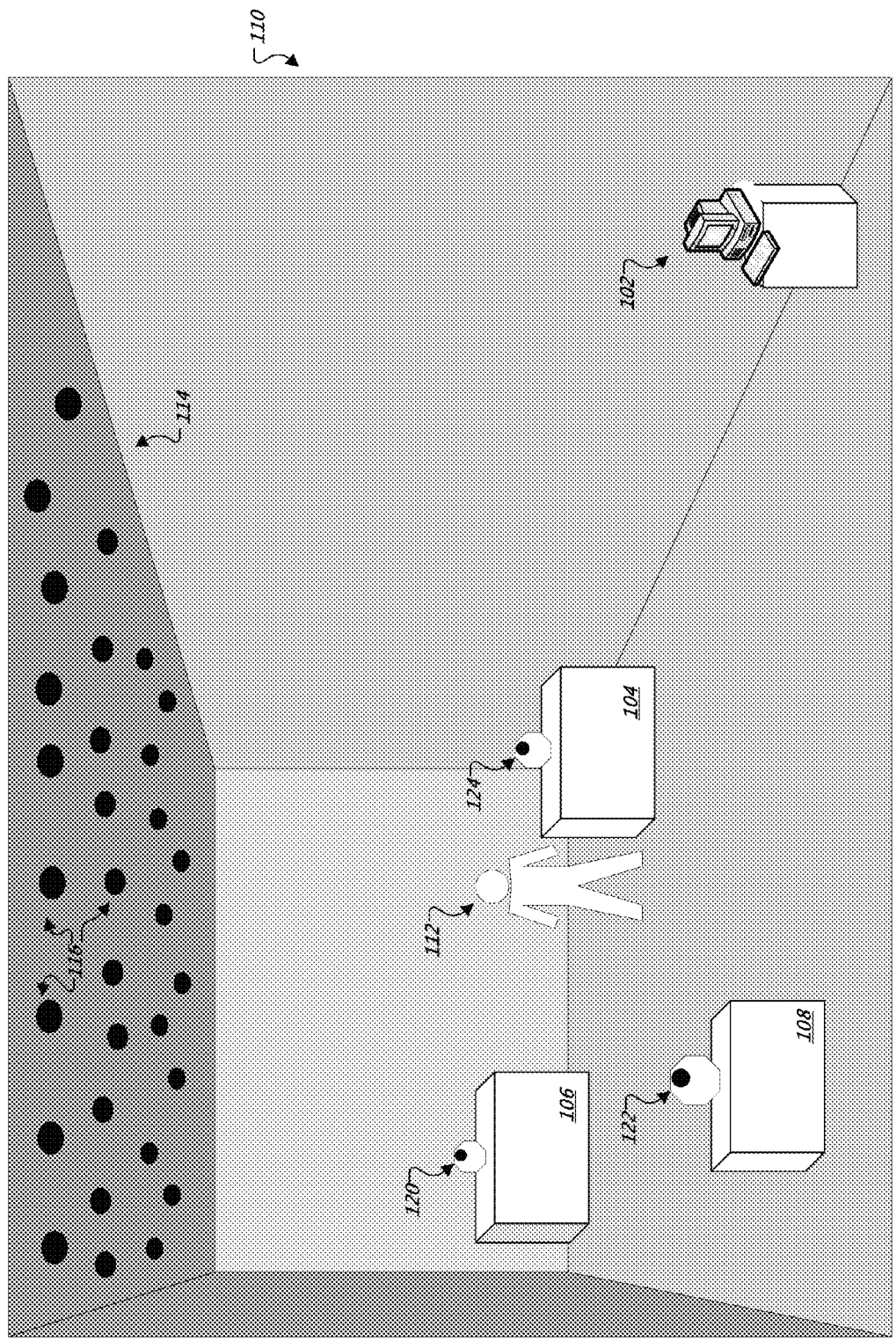
FIG. 1 is a diagram showing an example location system operable to determine locations of objects (e.g., equipment racks) in an example indoor facility.

FIG. 1 is a diagram showing an example location system 102 operable to determine locations of objects (e.g., equipment racks 104, 106, and 108) in an example indoor facility 110.

An object is anything that is tangible and has a shape or form. For example, an object can be an equipment rack, a vehicle, a person, a livestock animal, and so on. FIG. 1 illustrates equipment racks 104, 106, and 108 located in an indoor facility 110. An indoor facility is any room having at least one floor, wall, or ceiling. For example, an indoor facility can be a data center, a laboratory, a classroom, a pavilion, a shopping mall, and so on. The example indoor facility 110 depicted has a floor, walls, and a ceiling. A ceiling or a wall can be a solid or have one or more openings.

Objects can move or be moved. For example, equipment rack 104 is shown as being pushed by a person 112. In some data centers, equipment racks are frequently moved, for example, to optimize cooling of the equipment. In those data centers, specific equipment racks can be difficult to locate, especially where the data centers are large. Some data centers are as large as a football field. In other environments, objects move on their own. For example, in a mall, people move around the mall as they shop or browse. People frequently get lost in malls and would like to be able to figure out where they are.

The example indoor facility 110 has an example starfield 114 on its ceiling. A starfield (e.g., starfield 114) comprises indicia (e.g., indicia 116) that are on a surface (e.g., the ceiling of the indoor facility 110). Indicia are shapes of various sizes, forms, and colors that are, in some implementations, visually distinguishable from a background of a surface. For example, in the example starfield 114, the indicia are circular shapes that are darker than the background color of the ceiling. In some implementations, the indicia are visible to certain cameras (e.g., infrared cameras) but not to the human eye.

A surface can be decorated with a starfield of indicia using various techniques. For example, in the example indoor facility 110, a person 112 can use a paintball gun to decorate the ceiling with painted shapes. In another example, a projector can project shapes onto a surface to create a starfield.

In general, indicia are distributed randomly in a starfield. However, the locations of the indicia do not need to be strictly random. The locations need only be sufficiently random so that groups of indicia can be distinguished from other groups of indicia.

Additionally, the indicia are typically spaced closely enough so that the starfield covers a desired portion of the surface where objects will be located. That is, in general, the distance between any indicium and its nearest neighbor indicium is less than a threshold distance. Even so, in some implementations, indicia cannot thoroughly cover the surface, e.g., where the surface has obstructions (for instance, skylights) on it. Various configurations of indicia are possible.

Typically, objects that location system 102 can locate have cameras. A camera can be, for example, attached or affixed to an object, resting on top of the object, hanging from the object, held by the object (for instance, where the object is a person), and so on. For example, the equipment racks 104, 106, and 108 in the example indoor facility 110 have cameras 120, 122, and 124 on top of them.

The cameras are operable to capture an image of a portion of a surface having a starfield. A surface is the top part, outside part, or visible part of a physical structure. Typically, an object's camera faces the surface and has an unobstructed view of the surface. For example, each camera 120, 122, and 124 in the example indoor facility 110 faces the starfield 114 on the ceiling.

In some implementations, location system 102 uses some techniques related to identifying stars in photographs of the night sky taken from unknown perspectives. For example, examples of some of these techniques are described in "Blind astrometric calibration of arbitrary astronomical images," by Dustin Lang, David W. Hogg, Keir Mierle, Michael Blanton, and Sam Roweis, published in May/2010 in The Astronomical Journal, Volume 139, Issue 5, pp. 1782-1800 (2010).

Figure 2:
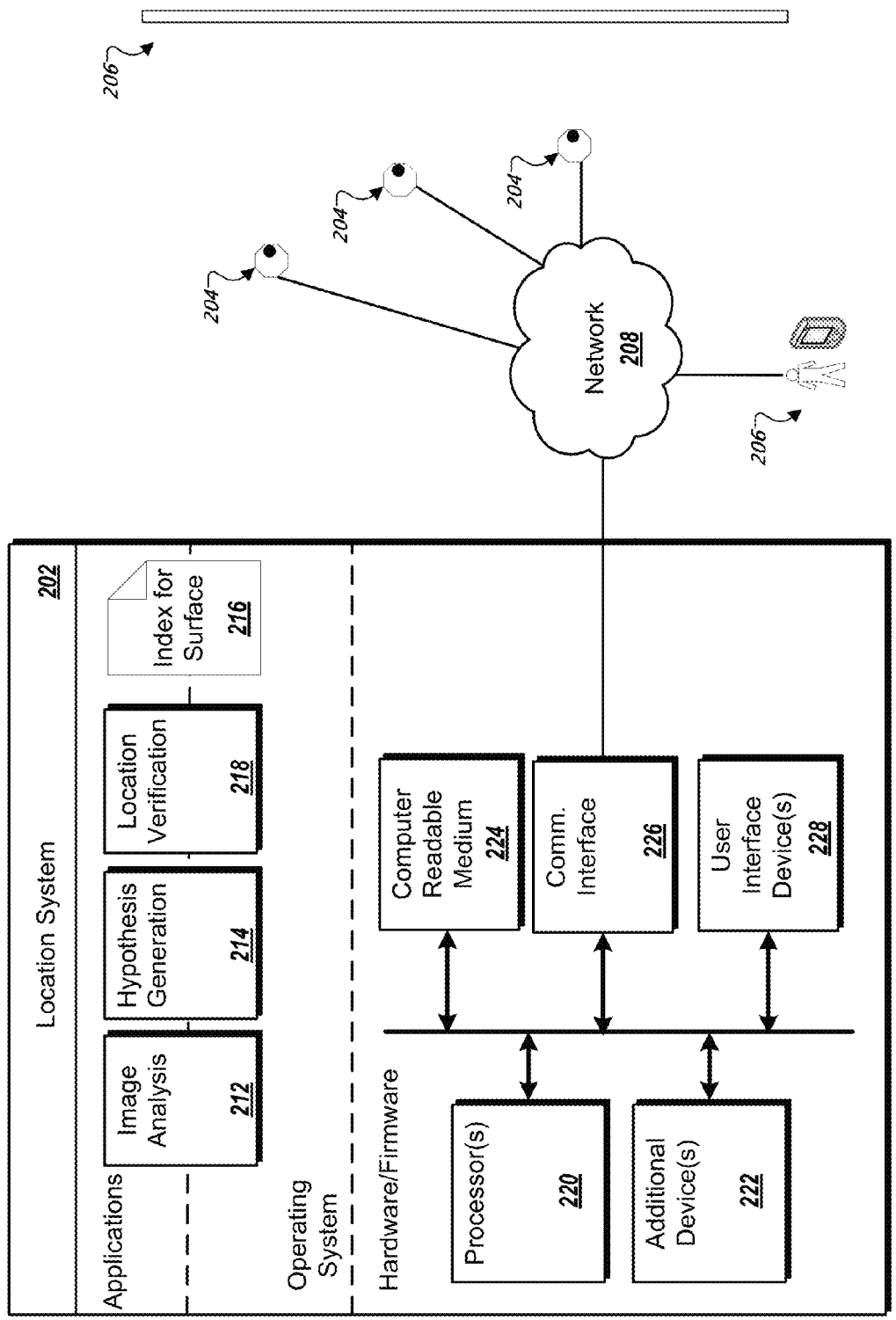
FIG. 2 is a diagram of an example location system operable to obtain images of a surface having a starfield from one or more cameras and provide location information.

FIG. 2 is a diagram of an example location system 202 operable to obtain images of a surface having a starfield 206 from one or more cameras 204 and provide location information.

The location system 202 consists of one or more data processing apparatus. While only one data processing apparatus is shown in FIG. 2, multiple data processing apparatus can be used. The location system includes various modules, e.g. executable software programs, including an image analysis module 212, a hypothesis generation module 214, and a location verification model 218. Each module runs as part of the operating system on the location system 202, runs as an application on the location system 202, or runs as part of the operating system and part of an application on the location system 202, for instance. Although several software modules are illustrated, there may be fewer or more software modules. Moreover, the software modules can be distributed on one or more data processing apparatus connected by one or more networks or other suitable communication mediums.

The location system 202 also includes hardware or firmware devices including one or more processors 220, one or more additional devices 222, a computer readable medium 224, a communication interface 226, and one or more user interface devices 228. Each processor 220 is capable of processing instructions for execution within the location system 202. In some implementations, the processor 220 is a single or multi-threaded processor. Each processor 220 is capable of processing instructions stored on the computer readable medium 224 or on a storage device such as one of the additional devices 222. The location system 202 uses its communication interface 226 to communicate with one or more cameras 204, computers, or computers connected to cameras 204, for example, over a network 208. Examples of user interface devices 228 include a display, a camera, a speaker, a microphone, a tactile feedback device, a keyboard, and a mouse. The location system 202 can store instructions that implement operations associated with the modules described above, for example, on the computer readable medium 224 or one or more additional devices 222, for example, one or more of a floppy disk device, a hard disk device, an optical disk device, or a tape device.

The location system 202 receives requests for locations of objects. For example, the location system 202 can receive a request from a user 206. In some implementations, the user has a mobile device and provides the request using a network 208. For example, a person in a data center can issue a request for the location of an equipment rack using the mobile device and a wireless network. The network can be, for example, a wireless network, a local area network (LAN), a wide area network (LAN), the Internet, or various combinations of various types of networks. In some other implementations, the user interacts directly with the location system 202 (e.g., where the location system 202 has a display device and an input device, the user can enter an identifier for an object and the location system 202 can display the location of the object on the display device).

In another example, the location system 202 receives requests from another system, e.g., over a network. For instance, the other system can be an auditing system. The other system can also be a system used for optimizing the locations of equipment racks for cooling. Various other systems are possible.

The location system 202 obtains images captured from the perspective of objects. The location system 202 obtains images from cameras 204 near the objects. The cameras 204 can be directly connected to the location system 202, or the cameras 204 can provide images using a network 208, or the cameras 204 can provide images using various other techniques.

The location system 202 is operable to perform image analysis 212 to identify local indicia within images. Identifying local indicia is described further with respect to FIG. 4.

The location system 202 is operable to generate hypotheses 214 as to the location of an object based on the local indicia identified in an image. Hypothesis generation includes using an index 216 of the indicia in the starfield of the surface 206. Hypothesis generation is described further with respect to FIG. 4.

The location system 202 is operable to verify 218 location hypotheses using the index 216 of the indicia in the starfield of the surface 206. Verification is described further with respect to FIG. 4. Based on the verification 218, the location system 202 determines the location of an object relative to the surface.

In some implementations, the location system 202 presents location information regarding an object on a display device connected to the location system 202. The location information can be, for example, a map showing the location of an object, coordinates of an object (for instance, hallway 5, aisle 9), one or more directions to the object, and so on. In some other implementations, the location system 202 sends location information to a user 206. For example, the location system 202 can send location information to a user's 206 mobile device. This is useful, for example, where the user is somewhere inside a large data center looking for an equipment rack, or where the user is in a mall and trying to figure out where he is.

Figure 3:
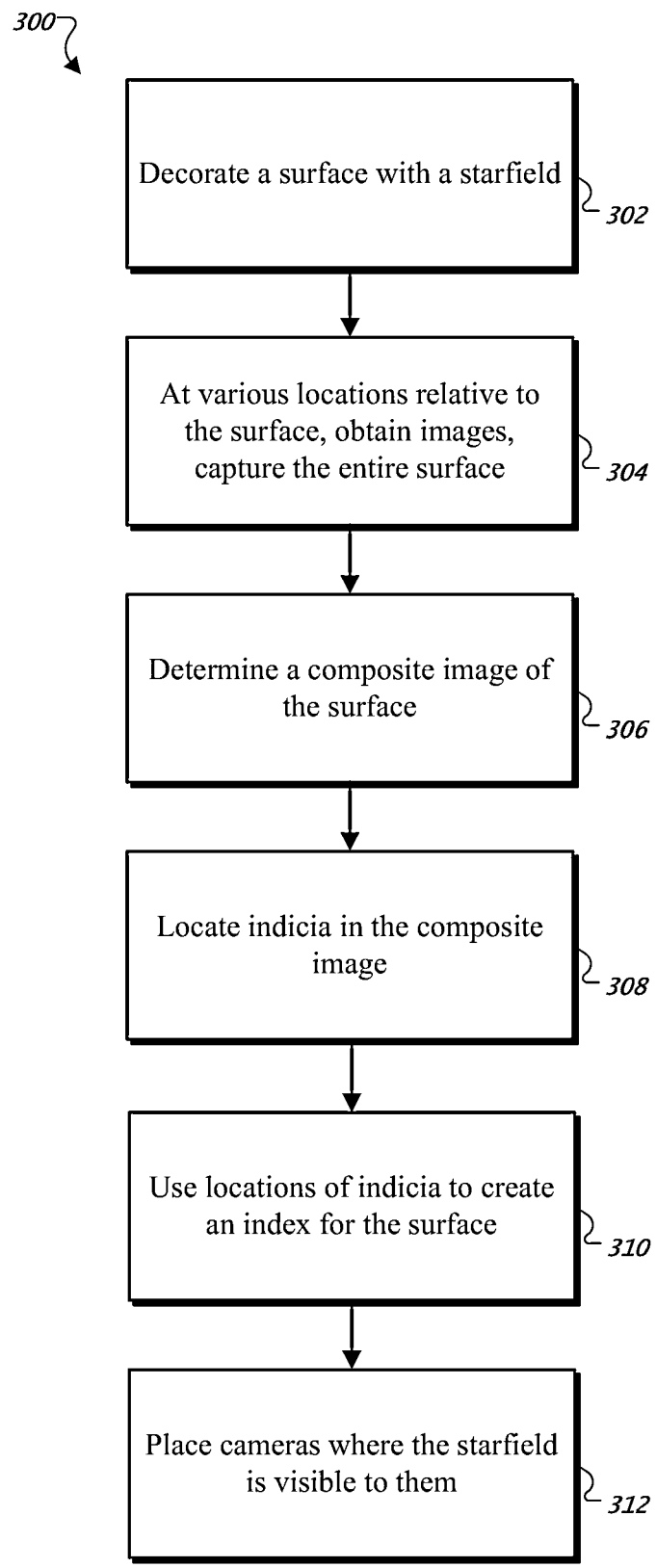
FIG. 3 is a flow diagram of an example technique for setting up a system for object location using a starfield.

FIG. 3 is a flow diagram of an example technique 300 for setting up a system for object location.

A surface is decorated with a starfield comprising indicia (step 302). A surface is the top part, outside part, or visible part of a physical structure. The surface is typically a ceiling, a floor, a wall, or the like. A surface can be flat or uneven, can contain openings and may include physical objects attached to the surface such as lighting, support beams, or other objects. The indicia are painted shapes, optically projected shapes, or any visible mark distinguishing certain locations from others. The surface can be decorated with the starfield, for example, by shooting paint blots onto surface with a paintball gun, or by projecting optical shapes onto the surface with a projector.

At various locations relative to the surface, images are obtained of portions of the surface (step 304). The images, taken as a whole, capture the entire surface, or one or more portions of the surface to be used for object location. In some implementations, a person walks around with a camera, methodically capturing images of the starfield. For example, the person could start near one corner of the starfield and proceed through the starfield in rows and columns, moving a few feet for each picture. In some other implementations, a robot takes the pictures (e.g., the robot can have a camera mounted on it and can be programmed to move slowly around the starfield, taking pictures after moving a specified distance).

A composite image of the surface is determined using the images obtained in step 304 (step 306). In some implementations, a computer determines the composite image without human input, for example, using image stitching techniques (e.g. image calibration, image registration, and image blending). For example, if the images all overlap and are in a predefined order (e.g., in rows and columns), the computer can start with a corner image and join neighboring images. The computer can remove overlapping image sections by comparing two neighboring images. In some other implementations, a computer determines the composite image by receiving human input. For example, a human can specify which images are neighbor images, and which images depict corners of the starfield.

Indicia are located in the composite image (step 308). Typically, image processing techniques are used to identify the indicia. Various image processing techniques can be used, for example techniques used to detect stars in pictures of the sky, or face detection and pedestrian detection, and others. For example, lighting artifacts can be removed, and image locations that contrast with a dominant color in the image can be labeled as indicia. In general, locating indicia in the image involves identifying areas of the image that are darker, brighter, or of different color than other areas of the image. In some implementations, techniques described in Section 2.1, "Star detection," of "Blind astrometric calibration of arbitrary astronomical images" are used to locate indicia. Various techniques for locating indicia are possible.

In some implementations, indicia are filtered and only the most distinctive indicia are kept. For example, indicia that are relatively small or that do not contrast very strongly in color or brightness can be disregarded.

The locations of the indicia are used to create an index of the indicia in the starfield (step 310). In some implementations, the index is a list of hash codes, where each hash code is a generated from a group of indicia (e.g., a group of four indicia). In some implementations, a group of indicia is a group of adjacent indicia. In some implementations, a group of indicia includes each indicia in a bounded region of an image. Techniques for determining hash codes for groups of indicia are discussed further with respect to FIGS. 5A and 5B. In these implementations, each hash code in the index is also associated with physical locations of indicia on the surface. For example, a hash code can be associated with coordinates, where the coordinates are based on an origin defined as one of the corners of the surface. In some implementations, techniques described in Section 2.3, "Indexing the sky," of "Blind astrometric calibration of arbitrary astronomical images" are used to create an index. Various techniques for creating the index are possible, and various formats of the index are possible.

In some implementations, the index is not based on images. Instead, the index is based on the locations of indicia received from another source. For example, in some implementations the indicia are projected onto a surface. In those implementations, the locations of the indicia are typically predetermined and provided to a projector. The locations provided to the projector can be used to create the index.

Cameras are associated with objects where the starfield is visible to the cameras (step 312). For example, the cameras can be placed on top of objects, attached to the sides of objects, or hung from objects. The cameras are able to provide images to a location system (e.g., location system 202). For example, the cameras can be connected to a wireless network in order to transmit images to the location system 202.

After the cameras are placed, a location system can use the index of the indicia in the starfield to locate objects.

Figure 4:
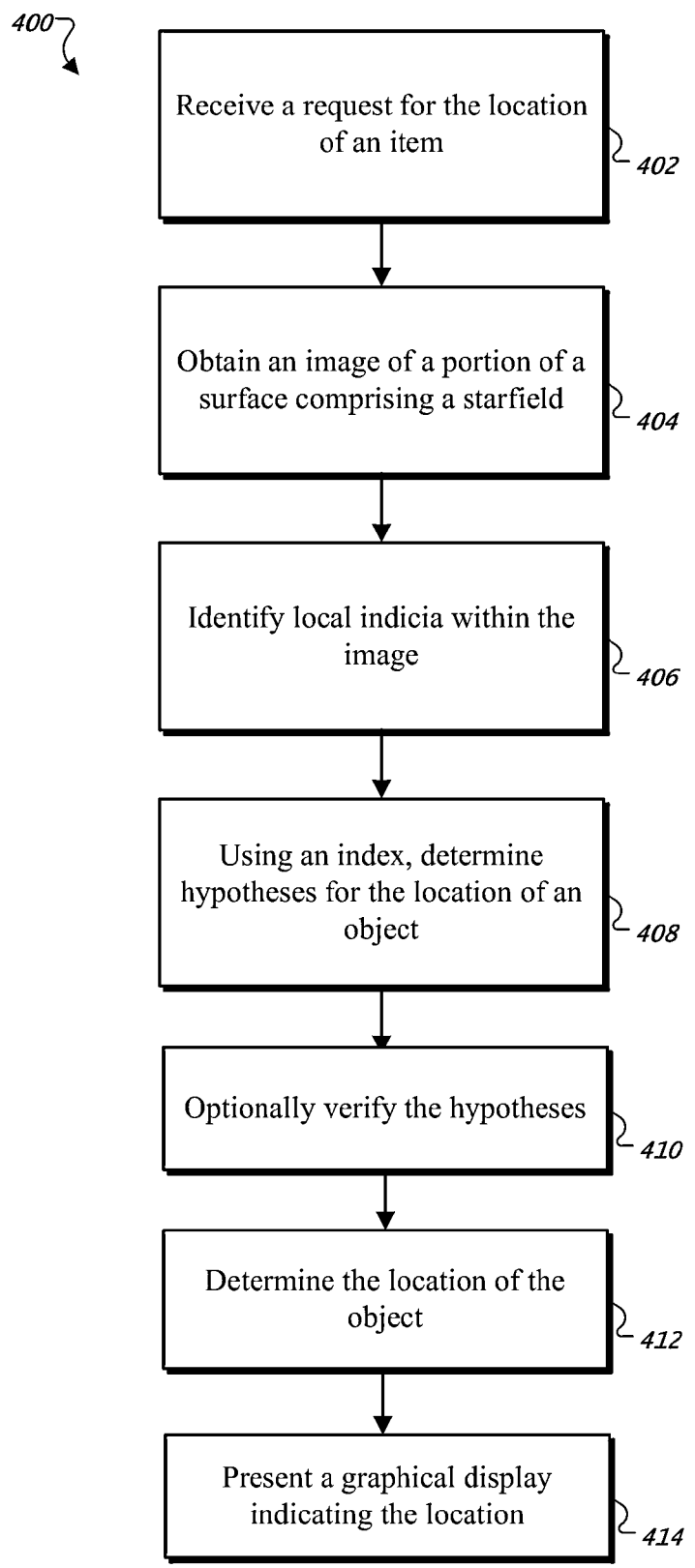
FIG. 4 is a flow diagram of an example technique for locating an object.

FIG. 4 is a flow diagram of an example technique 400 for locating an object. In some implementations, the technique 400 is performed by a system, for example, location system 102, location system 202, or the like.

A request is received for the location of an object (step 402). In some implementations, the request is from a user. In some other implementations, the request is from another system, e.g., an auditing system.

An image is obtained (step 404). The image is captured from the perspective of the object. The image depicts a portion of a surface comprising a starfield wherein the starfield comprises a plurality of indicia. For example, the location system 102 can send an electronic message requesting an image to a device in the equipment rack 106 by way of the device's Internet Protocol (IP) address. The device can respond to the message by capturing a new image using camera 120 (or using a previously captured image) and sending the image, or a version of the image, to the location system 102. For example, a version of the image can be a list of locations of indicia within the image rather than the image itself. Other versions are possible.

Local indicia within the image are identified (step 406). The local indicia can be identified using various image processing techniques. Various image processing techniques can be used, for example techniques used to detect stars in pictures of the sky, or face detection and pedestrian detection, and others. For example, lighting artifacts can be removed, and image locations that contrast with a dominant color in the image can be labeled as indicia. In general, locating indicia in the image involves identifying areas of the image that are darker, brighter, or of different color than other areas of the image. In some implementations, the identified local indicia are filtered to remove indicia that are less distinctive (e.g., darkest or lightest) than other indicia. In some implementations, techniques discussed in Section 2.1, "Star detection," of "Blind astrometric calibration of arbitrary astronomical images" are used to identify local indicia.

In some implementations, identifying local indicia within the image includes detecting and removing features of the surface from the image. The features are, for example, lines, which are common in various indoor facilities such as data centers. In some implementations, identifying the local indicia within the image includes adjusting the image for variations of the orientation of the camera towards the surface.

In some implementations, hypotheses for the location of the object are determined using the locations of the local indicia and an index of the indicia in the starfield (step 408). A hypothesis for the location is determined when a match between the local indicia and some indicia in the index is found. Various techniques for determining hypotheses are possible. In some implementations, techniques discussed in Section 2.2, "Hashing of asterisms to generate hypotheses," of "Blind astrometric calibration of arbitrary astronomical images" are used for determining hypotheses.

In some implementations, the index includes a plurality of hash codes, each hash code being based on the locations of a group of indicia in the starfield. In some of those implementations, determining a hypothesis includes determining an object hash code using local indicia and comparing the object hash code to hash codes in the index. If the object hash code is equal to (or approximately equal to) a hash code in the index, a location associated with the hash code in the index is determined to be a hypothesis for the location of the object.

In some implementations, the local indicia are subdivided into smaller groups of indicia (e.g., groups of four). In those implementations, matches for each smaller group are searched for in the index. Multiple hypotheses can be generated for each smaller group. Additional hypotheses can be generated for all of the local indicia as a whole.

In some implementations, the determined hypotheses are verified (step 410). Various techniques for verifying hypotheses are possible. In some implementations, techniques discussed in Section 2.4, "Verification of hypotheses," of "Blind astrometric calibration of arbitrary astronomical images" are used for verification of hypotheses.

For example, in some implementations, verifying a hypothesis includes finding entries in the index for a group of indicia near the hypothesized location of a local group of indicia. The locations of the indicia near the hypothesized location can be checked against other local indicia identified in the image.

The location of the object is determined (step 412). In general, the location of the object is determined in a two-dimensional space. The two-dimensional space corresponds to the surface.

In some implementations, a verified hypothesized location is translated into a physical location. For example, where a group of local indicia is determined to match (e.g., have an equal hash code, or have a hash code having a specified difference or less) a group of indicia in the index, the physical locations of the indicia in the index (the actual locations of those indicia on the surface) can be used as the location of the camera that took the image or the object.

In some implementations, other location information about the object is determined. For example, where the object is an equipment rack in a data center, the data center can be divided into aisles and rows. The location of the object can be mapped onto the aisles and TOWS.

In some implementations, a graphical display is presented indicating the location of the object (step 414). The displayed information can be, for example, a map showing the location of an object, coordinates of an object (for instance, hallway 5, aisle 9), one or more directions to the object, and so on. In some implementations, location information is sent to a user (e.g., the user's mobile device).

Figure 5A:
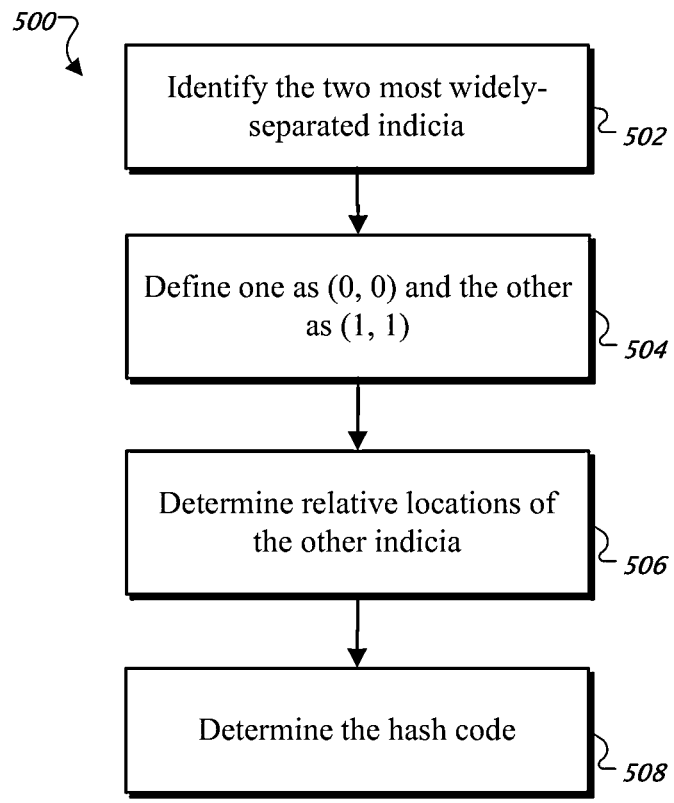
FIG. 5A is a flow diagram of an example technique for determining a hash code for a group of indicia.
Figure 5B:
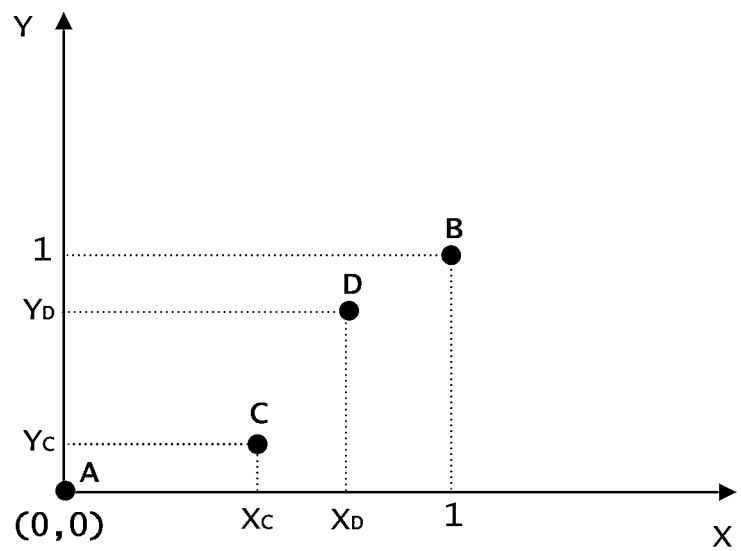
FIG. 5B is a diagram of an example group of indicia.

FIG. 5A is a flow diagram of an example technique 500 for determining a hash code for a group of indicia. FIG. 5B is a diagram of an example group of indicia. For purposes of illustration, FIG. 5B will be referred to during the discussion of FIG. 5A. The technique 500 is applicable to various groups of indicia in addition to the example group shown in FIG. 5B (e.g., although four indicia are shown, the technique 500 can be used for variable numbers of indicia, for instance, three or five or more). In some implementations, the technique 500 is performed by a system (e.g., location system 102 or location system 202).

The two indicia that are the most widely-separated in the group are identified (step 502; e.g., by the location system 202). For example, in FIG. 5B, indicium A and indicium B are more widely separated (that is, farther apart) than any other pair of indicia.

One of the two most widely-separated indicia is defined as location (0, 0) and the other is defined as location (1, 1) (step 504). The locations refer to locations in a coordinate system. For example, in FIG. 5B, indicium A is defined as (0, 0) and indicium B is defined as (1, 1).

The relative locations of the other indicia are determined (step 506). The relative locations are relative to the two most widely-separated indicia (that is, defined with the coordinate system defined by those indicia). For example, in FIG. 5B, the relative location of indicium C is (Xc, Yc) and the relative location of indicium D is (Xd, Yd).

The hash code is determined using the relative locations of the other indicia (step 508). In some implementations, the hash code is a vector including the coordinate locations of the other indicia in a coordinate system relative to a subset of the indicia with well-defined properties (e.g., the two most widely-separated indicia). For example, in FIG. 5B, the hash code for the indicia A, B, C, and D is the 4-vector (Xc, Yc, Xd, Yd), in the coordinate frame with A at (0,0) and B at (1,1).

Various techniques for determining hash codes for groups of indicia are possible. In some implementations, techniques discussed in Section 2.2, "Hashing of asterisms to generate hypotheses," of "Blind astrometric calibration of arbitrary astronomical images" are used for determining hash codes.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
applying, by one or more computing devices, a plurality of visible indicia on a surface of an indoor facility such that a distance between any visible indicium of the plurality of visible indicia and a nearest visible indicium in the plurality of visible indicia is less than a threshold;
obtaining, by the one or more computing devices, a first image captured from a camera, the first image being of a first portion of the surface of the indoor facility comprising the plurality of visible indicia, the camera having an orientation generally pointed at the surface;
moving, by the one or more computing devices, the camera a specified distance;
obtaining, by the one or more computing devices, a second image captured from the camera of the indoor facility, the second image being of a second portion of the surface of the indoor facility comprising the plurality of visible indicia, the camera having an orientation generally pointed at the surface;
determining, by the one or more computing devices, a composite image based on the first image and the second image;
locating, by the one or more computing devices, a plurality of indicia within the composite image;
determining, by the one or more computing devices, an index of the visible indicia of the surface based on the plurality of indicia;
obtaining, by the one or more computing devices, a third image captured from the camera in proximity of an object located in an indoor facility, the third image being of a third portion of the surface of the indoor facility comprising the plurality of visible indicia, the camera having an orientation generally pointed at the surface;
identifying, by the one or more computing devices, a plurality of local indicia within the third image;
using the locations of the local indicia within the third image and the index of the visible indicia of the surface, determining, by the one or more computing devices, the location of the object relative to the surface, including:
determining, by the one or more computing devices, a plurality of locations of the local indicia within the third image;
determining, by the one or more computing devices, an object hash code using the locations of two most widely-separated local indicia and comparing the object hash code to a plurality of hash codes in the index of the visible indicia on the surface; and
based on the location of the local indicia on the surface, determining, by the one or more computing devices, the location of the object.

2. The method of claim 1, where the plurality of visible indicia are painted shapes or optically projected shapes.

3. The method of claim 1, where the visible indicia are distributed on the surface in a random pattern.

4. The method of claim 1, where the object is an equipment rack and the surface is a ceiling of the indoor facility.

5. The method of claim 1, where identifying the plurality of local indicia within the image includes detecting and removing features of the surface from the image.

6. The method of claim 5, where the features comprise lines.

7. The method of claim 1, where identifying the plurality of local indicia within the image includes adjusting the image for variations of the orientation of the camera towards the surface.

8. The method of claim 1, where determining the location of the object further comprises verifying one or more location hypotheses.

9. The method of claim 1, further comprising:
receiving a request for the location of the object.

10. The method of claim 1, further comprising:
presenting a graphical display including an indication of the location of the object.

11. The method of claim 10, where:
the request is received from a user using a mobile device; and
presenting a graphical display comprises sending location information to the mobile device.

12. A system comprising:
one or more processors configured to interact with a computer storage medium in order to perform operations comprising:
applying a plurality of visible indicia on a surface of an indoor facility such that a distance between any visible indicium of the plurality of visible indicia and a nearest visible indicium in the plurality of visible indicia is less than a threshold;
obtaining a first image captured from a camera, the first image being of a first portion of the surface of the indoor facility comprising the plurality of visible indicia, the camera having an orientation generally pointed at the surface;
moving the camera a specified distance;
obtaining a second image captured from the camera of the indoor facility, the second image being of a second portion of the surface of the indoor facility comprising the plurality of visible indicia, the camera having an orientation generally pointed at the surface;
determining a composite image based on the first image and the second image;
locating a plurality of indicia within the composite image;

determining an index of the visible indicia of the surface based on the plurality of indicia;

obtaining a third image captured from the camera in proximity of an object located in an indoor facility, the third image being of a third portion of the surface of the indoor facility comprising the plurality of visible indicia, the camera having an orientation generally pointed at the surface;

identifying a plurality of local indicia within the third image;

using the locations of the local indicia within the third image and the index of the visible indicia of the surface, determining the location of the object relative to the surface, including:

determining a plurality of locations of the local indicia within the third image;

determining an object hash code using the locations of two most widely-separated local indicia and comparing the object hash code to a plurality of hash codes in the index of the visible indicia on the surface; and based on the location of the local indicia on the surface, determining the location of the object.

13. The system of claim 12, where the plurality of visible indicia are painted shapes or optically projected shapes.

14. The system of claim 12, where the visible indicia are distributed on the surface in a random pattern.

15. The system of claim 12, where the object is an equipment rack and the surface is a ceiling of the indoor facility.

16. The system of claim 12, where identifying the plurality of local indicia within the image includes detecting and removing features of the surface from the image.

17. The system of claim 16, where the features comprise lines.

18. The system of claim 12, where identifying the plurality of local indicia within the image includes adjusting the image for variations of the orientation of the camera towards the surface.

19. The system of claim 12, where determining the location of the object further comprises verifying one or more location hypotheses.

20. The system of claim 12, the operations further comprising:
receiving a request for the location of the object.

21. The system of claim 12, the operations further comprising:
presenting a graphical display including an indication of the location of the object.

22. The system of claim 21, where:
the request is received from a user using a mobile device; and
presenting a graphical display comprises sending location information to the mobile device.

23. A non-transitory computer storage medium encoded with a computer program, the program comprising instructions that when executed by data processing apparatus cause the data processing apparatus to perform operations comprising:

applying a plurality of visible indicia on a surface of an indoor facility such that a distance between any visible indicium of the plurality of visible indicia and a nearest visible indicium in the plurality of visible indicia is less than a threshold;

obtaining a first image captured from a camera, the first image being of a first portion of the surface of the indoor facility comprising the plurality of visible indicia, the camera having an orientation generally pointed at the surface;

moving the camera a specified distance;

obtaining a second image captured from the camera of the indoor facility, the second image being of a second portion of the surface of the indoor facility comprising the plurality of visible indicia, the camera having an orientation generally pointed at the surface;

determining a composite image based on the first image and the second image;

locating a plurality of indicia within the composite image;

determining an index of the visible indicia of the surface based on the plurality of indicia;

obtaining a third image captured from the camera in proximity of an object located in an indoor facility, the third image being of a third portion of the surface of the indoor facility comprising the plurality of visible indicia, the camera having an orientation generally pointed at the surface;

identifying a plurality of local indicia within the third image;

using the locations of the local indicia within the third image and the index of the visible indicia of the surface, determining the location of the object relative to the surface, including:

determining a plurality of locations of the local indicia within the third image;

determining an object hash code using the locations of two most widely-separated local indicia and comparing the object hash code to a plurality of hash codes in the index of the visible indicia on the surface; and based on the location of the local indicia on the surface, determining the location of the object.

* * * * *

UNITED STATES PATENT AND TRADEMARK OFFICE
CERTIFICATE OF CORRECTION

| | |
|---|---|
| PATENT NO. | : 8,724,848 B1 |
| APPLICATION NO. | : 12/944597 |
| DATED | : May 13, 2014 |
| INVENTOR(S) | : Heath et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this
Twenty-eighth Day of July, 2015

Michelle K. Lee
*Director of the United States Patent and Trademark Office*